United States Patent
Kuwabara et al.

(10) Patent No.: US 10,608,275 B2
(45) Date of Patent: Mar. 31, 2020

(54) REDOX FLOW BATTERY CELL, REDOX FLOW BATTERY CELL STACK, AND REDOX FLOW BATTERY

(71) Applicant: Sumitomo Electric Industries, Ltd., Osaka-shi (JP)

(72) Inventors: Masahiro Kuwabara, Osaka (JP); Takashi Kanno, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 98 days.

(21) Appl. No.: 15/774,711

(22) PCT Filed: Sep. 8, 2017

(86) PCT No.: PCT/JP2017/032571
§ 371 (c)(1),
(2) Date: May 9, 2018

(87) PCT Pub. No.: WO2019/049333
PCT Pub. Date: Mar. 14, 2019

(65) Prior Publication Data
US 2019/0237791 A1    Aug. 1, 2019

(51) Int. Cl.
*H01M 8/18* (2006.01)
*H01M 8/2455* (2016.01)

(52) U.S. Cl.
CPC ............ *H01M 8/188* (2013.01); *H01M 8/18* (2013.01); *H01M 8/2455* (2013.01)

(58) Field of Classification Search
None
See application file for complete search history.

(56) References Cited

U.S. PATENT DOCUMENTS

| 2014/0220463 A1* | 8/2014 | Daniel | H01M 8/04276 429/415 |
| 2017/0047594 A1* | 2/2017 | Hanafusa | H01M 8/2459 |

FOREIGN PATENT DOCUMENTS

| CN | 102842730 A | * 12/2012 | |
| JP | 2012-099368 A | 5/2012 | |
| JP | 2015-503210 A | 1/2015 | |
| WO | 2013/095374 A2 | 6/2013 | |
| WO | WO-2015162954 A1 * | 10/2015 | ............. B29C 66/72 |

OTHER PUBLICATIONS

ESpacenet Machine Translation of CN102842730A Ren (Year: 2012).*

* cited by examiner

*Primary Examiner* — Jonathan G Leong
*Assistant Examiner* — Kirsten B Tysl
(74) *Attorney, Agent, or Firm* — Baker Botts L.L.P.; Michael A. Sartori

(57) ABSTRACT

A redox flow battery cell includes a positive electrode, a negative electrode, and a membrane interposed between the positive electrode and the negative electrode. The positive electrode and the negative electrode have an overlapping region where the positive electrode and the negative electrode overlap each other with the membrane therebetween, and at least one of the positive electrode and the negative electrode has a non-overlapping region where the positive electrode and the negative electrode do not overlap each other with the membrane therebetween. The total area of the non-overlapping region is 0.1% to 20% of the area of the overlapping region.

8 Claims, 4 Drawing Sheets

REDOX FLOW BATTERY CELL, REDOX FLOW BATTERY CELL STACK, AND REDOX FLOW BATTERY

TECHNICAL FIELD

The present invention relates to a redox flow battery cell, a redox flow battery cell stack, and a redox flow battery.

BACKGROUND ART

As one of large-capacity storage batteries, a redox flow battery (hereinafter, may be referred to as an "RF battery") is known, the redox flow battery performing charging and discharging by circulating electrolytes to a positive electrode and a negative electrode which are arranged with a membrane being interposed therebetween (refer to Patent Literature 1). Patent Literature 1 discloses a cell stack in which cell frames, positive electrodes, membranes (ion-exchange membranes), and negative electrodes are repeatedly stacked. A cell frame includes a frame body and a bipolar plate integrated with the frame body. In the cell stack, between the bipolar plates of adjacent cell frames, a positive electrode and a negative electrode are arranged with a membrane therebetween, thus constituting a cell.

CITATION LIST

Patent Literature

PTL 1: Japanese Unexamined Patent Application Publication No. 2012-99368

SUMMARY OF INVENTION

A redox flow battery cell according to the present disclosure includes a positive electrode, a negative electrode, and a membrane interposed between the positive electrode and the negative electrode. The positive electrode and the negative electrode have an overlapping region where the positive electrode and the negative electrode overlap each other with the membrane therebetween, and at least one of the positive electrode and the negative electrode has a non-overlapping region where the positive electrode and the negative electrode do not overlap each other with the membrane therebetween. The total area of the non-overlapping region is 0.1% to 20% of the area of the overlapping region.

A redox flow battery cell stack according to the present disclosure includes the redox flow battery cells according to the present disclosure, the redox flow battery cells being repeatedly stacked.

A redox flow battery according to the present disclosure includes the redox flow battery cell according to the present disclosure or the redox flow battery cell stack according to the present disclosure.

DESCRIPTION OF EMBODIMENTS

Figure 1:
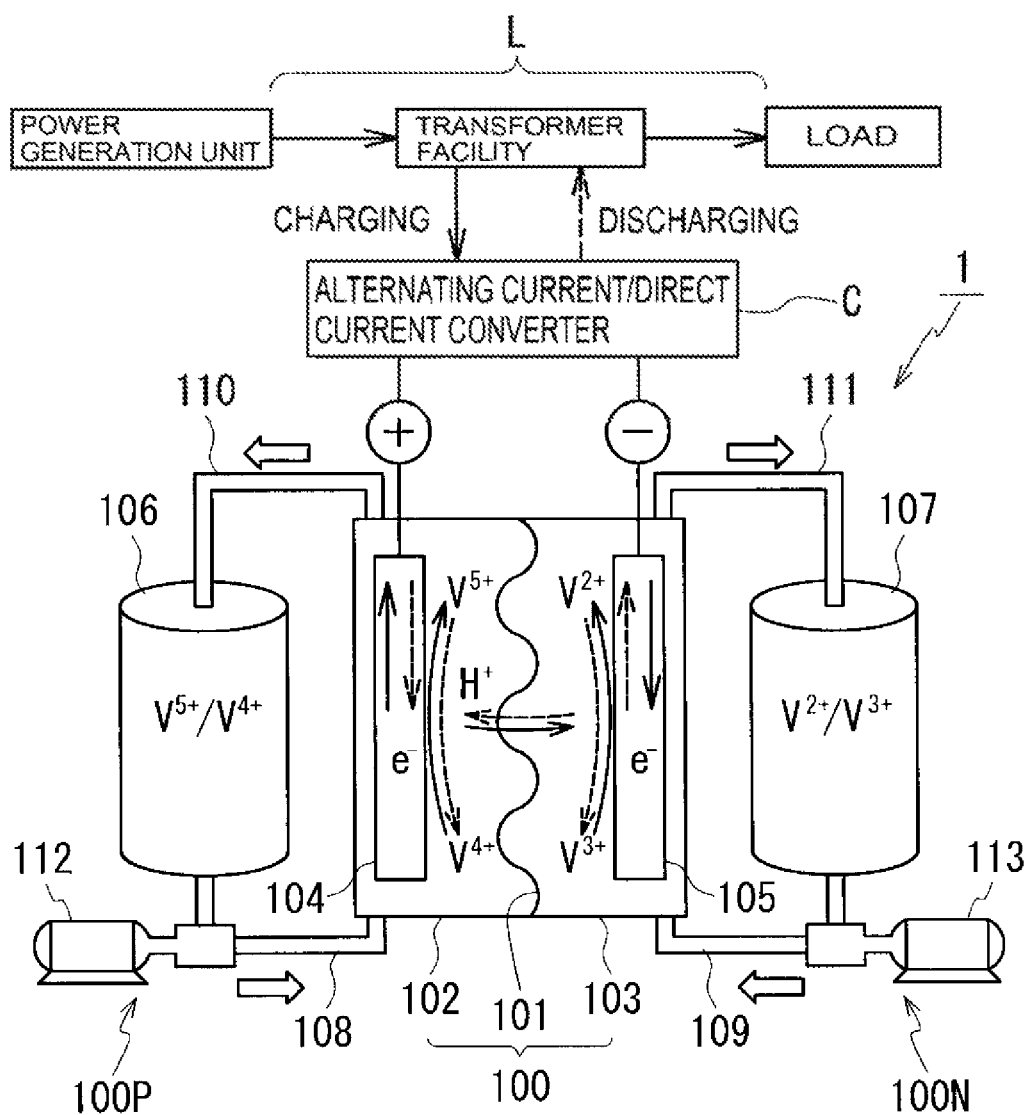
FIG. 1 is an operating principle diagram of a redox flow battery according to an embodiment.

Problems to be Solved by the Present Disclosure

In an RF battery, it is desired that the operation can be restarted on its own during power failure in a power system.

An RF battery performs charging and discharging by circulating electrolytes, by using pumps, into a cell in which a positive electrode and a negative electrode are arranged so as to face each other with a membrane therebetween. In general, in the RF battery, pumps are driven by supplying power to the pumps from an external power system. When power failure occurs in the power system, the pumps stop and thus, electrolyte flow stops. Therefore, discharging from the RF battery to the power system cannot be performed even if discharging is desired. Accordingly, it is required to supply the necessary power to start pumps from the cell (or cell stack) so that the operation of the RF battery can be restarted on its own during power failure in the power system.

In the RF battery, even when pumps stop during power failure in the power system, since the electrolyte remains in the cell, the pumps can be started by using power generated by discharging of the electrolyte between positive and negative electrodes in the cell. However, in an existing RF battery cell, usually, the area of the positive electrode is equivalent to the area of the negative electrode, and the positive and negative electrodes are arranged such that the entire surfaces of the two electrodes overlap each other with a membrane therebetween. Therefore, battery reactions take place over the entire surfaces of the two electrodes. Accordingly, in the existing cell, for example, when power failure occurs in a power system during discharging of the RF battery, as a result of the discharge reaction, the electrolyte in the cell is in a discharged state, and it may not be possible to sufficiently secure the necessary power to start pumps by using the electrolyte remaining in the cell in some cases. Furthermore, self-discharge of the electrolyte between the two electrodes is likely to proceed, and during the downtime of the pumps, the power stored in the electrolyte in the cell is likely to be consumed by self-discharge. Therefore, there is a severe time constraint on the period from the stop of pumps due to power failure in the power system until the start of the pumps.

Accordingly, an object of the present disclosure is to provide a redox flow battery cell and a redox flow battery cell stack in which the power for starting pumps can be supplied during power failure in a power system. Another object of the present disclosure is to provide a redox flow battery which can restart operation on its own during power failure in the power system.

Advantageous Effects of the Present Disclosure

According to the present disclosure, it is possible to provide a redox flow battery cell and a redox flow battery cell stack in which the power for starting pumps can be supplied during power failure in a power system. Furthermore, according to the present disclosure, it is possible to provide a redox flow battery which can restart operation on its own during power failure in a power system.

DESCRIPTION OF EMBODIMENTS OF THE PRESENT INVENTION

First, the contents of the embodiments of the present invention will be enumerated and described.

(1) A redox flow battery cell according to an embodiment includes a positive electrode, a negative electrode, and a membrane interposed between the positive electrode and the negative electrode. The positive electrode and the negative electrode have an overlapping region where the positive electrode and the negative electrode overlap each other with the membrane therebetween, and at least one of the positive electrode and the negative electrode has a non-overlapping region where the positive electrode and the negative electrode do not overlap each other with the membrane therebetween. The total area of the non-overlapping region is 0.1% to 20% of the area of the overlapping region.

In the redox flow battery cell, the positive electrode and the negative electrode are arranged so as to have an overlapping region and a non-overlapping region of the positive electrode and the negative electrode, and the total area of the non-overlapping region in the two electrodes is 0.1% to 20% of the area of the overlapping region. The term "overlapping region" refers to a region where the positive electrode and the negative electrode overlap each other when the positive electrode and the negative electrode are perspectively viewed from one side. On the other hand, the term "non-overlapping region" refers to a region, excluding the overlapping region, where the positive electrode and the negative electrode do not overlap each other. The overlapping region is a portion that contributes to the battery reaction between the two electrodes, and the non-overlapping region is a portion that does not contribute to the battery reaction between the two electrodes.

In the redox flow battery cell, at least one of the positive electrode and the negative electrode has a non-overlapping region. Since the non-overlapping region does not contribute to the battery reaction, the unreacted electrolyte that has not participated in the battery reaction is present in the non-overlapping region. That is, in the case where pumps stop during power failure in a power system and electrolyte flow stops, the unreacted electrolyte remains partially in the cell. During the downtime of the pumps, the unreacted electrolyte that is present in the non-overlapping region diffuses into the overlapping region, and accordingly, because of discharging between the two electrodes, the necessary power to start pumps can be supplied from the cell. Therefore, for example, even when power failure occurs in the power system during discharging of the RF battery and pumps stop, the necessary power to start pumps can be secured by the electrolyte that has not participated in the battery reaction and is present in the non-overlapping region. Furthermore, even if self-discharge of the electrolyte proceeds in the overlapping region between the two electrodes during the downtime of the pumps, since the unreacted electrolyte that is present in the non-overlapping region diffuses into the overlapping region, the power stored in the unreacted electrolyte can be discharged over a long period of time. Accordingly, it is possible to ease the time constraint on the period from the stop of pumps due to power failure in the power system until the start of the pumps. Therefore, in the redox flow battery cell, the power for starting pumps during power failure in the power system can be supplied, and even under the condition where power is not supplied from the outside to the pumps, the pumps can be started.

In the redox flow battery cell, since the total area of the non-overlapping region is 0.1% or more of the area of the overlapping region, by securing the amount of electrolyte flowing in the non-overlapping region, the necessary power to start pumps during power failure in the power system is easily secured. On the other hand, as the area ratio of the non-overlapping region increases, the proportion of the electrolyte that flows in the non-overlapping region increases, and the amount of electrolyte flowing in the overlapping region decreases. Since the total area of the non-overlapping region is 20% or less of the area of the overlapping region, by securing the overlapping region that contributes to the battery reaction, a decrease in output during charging and discharging can be suppressed.

(2) In the redox flow battery cell according to the embodiment, each of the positive electrode and the negative electrode may have the non-overlapping region.

When each of the positive electrode and the negative electrode has the non-overlapping region, the unreacted electrolyte is present in the non-overlapping region of each electrode. Therefore, it is possible to reliably cause discharging of the electrolyte between the two electrodes, and by supplying the necessary power to start pumps during power failure in the power system, the pumps can be reliably started.

(3) In the redox flow battery cell according to the embodiment, the positive electrode may have an area equivalent to that of the negative electrode.

In the case where the positive electrode has an area equivalent to that of the negative electrode, non-overlapping regions having the same area are formed in the positive electrode and the negative electrode, and the same amount of electrolyte flows in the non-overlapping region of each electrode. Therefore, it is possible to sufficiently cause discharging of the electrolyte between the two electrodes, and the necessary power to start pumps during power failure in the power system can be sufficiently supplied. The expression "the positive electrode has an area equivalent to that of the negative electrode" means that the two electrodes have substantially the same area. For example, when the difference in the area between the two electrodes is 0.01% or less of the area of each electrode, the areas of the two electrodes are considered to be equivalent to each other. Here, the area of the positive electrode and the area of the negative electrode refer to the planar areas of the planes of the electrodes that face each other.

(4) In the redox flow battery cell according to the embodiment, the positive electrode and the negative electrode each may have a thickness of 0.05 mm or more.

When the two electrodes each have a thickness of 0.05 mm or more, the amount of electrolyte flowing in the non-overlapping region is sufficiently easily secured. Accordingly, the necessary power to start pumps during power failure in the power system is sufficiently easily secured. Here, the thickness of each of the positive electrode and the negative electrode is the thickness of the electrode when arranged inside the cell. In the case where, the electrodes are held in a compressed state in the cell, the thickness of each electrode refers to the thickness of the electrode in the compressed state.

(5) In the redox flow battery cell according to the embodiment, the positive electrode and the negative electrode each may have an area of 250 $cm^2$ or more.

When the two electrodes each have an area of 250 $cm^2$ or more, the area of each of the overlapping region and the non-overlapping region is sufficiently easily secured, and the amount of electrolyte flowing in each region is sufficiently easily secured. Accordingly, output during charging and discharging can be secured, and the necessary power to start pumps during power failure in the power system is sufficiently easily secured.

(6) A redox flow battery cell stack according to an embodiment includes the redox flow battery cells according to any one of items (1) to (5), the redox flow battery cells being repeatedly stacked.

Since the redox flow battery cell stack includes the redox flow battery cells according to the embodiment, it is possible to supply the power for starting pumps during power failure in the power system. The redox flow battery cell stack includes a plurality of cells, and it is possible to secure the necessary power to start pumps by using the unreacted electrolyte present in the non-overlapping region in each cell. Accordingly, the necessary power to start pumps can be sufficiently supplied from the cell stack.

(7) A redox flow battery according to an embodiment includes the redox flow battery cell according to any one of items (1) to (5) or the redox flow battery cell stack according to item (6).

Since the redox flow battery includes the redox flow battery cell or redox flow battery cell stack according to the embodiment, the necessary power to start pumps during power failure in the power system can be supplied from the cell or cell stack, and the pumps can be started. Accordingly, the redox flow battery can restart operation on its own during power failure in the power system.

Detailed Description of Embodiments of the Present Invention

Specific examples of a redox flow battery cell (hereinafter, may be simply referred to as the "cell"), a redox flow battery cell stack (hereinafter, may be simply referred to as the "cell stack"), and a redox flow battery (RF battery) according to embodiments of the present invention will be described below with reference to the drawings. In the drawings, the same reference signs denote the same or equivalent components. The present invention is not limited to the examples, but the scope of the present invention is defined by the appended claims, and is intended to include all modifications within the meaning and scope equivalent to those of the claims.

<<RF Battery>>

Examples of an RF battery 1 according to an embodiment, and a cell 100 and a cell stack 2 provided in the RF battery 1 will be described with reference to FIGS. 1 to 5. The RF battery 1 shown in FIGS. 1 and 2 uses a positive electrode electrolyte and a negative electrode electrolyte, each containing, as an active material, metal ions whose valence is changed by oxidation-reduction, and performs charging and discharging using the difference between the oxidation-reduction potential of ions contained in the positive electrode electrolyte and the oxidation-reduction potential of ions contained in the negative electrode electrolyte. The example of the RF battery 1 shown in FIG. 1 is a vanadium-based RF battery which uses a vanadium electrolyte containing V ions serving as an active material for each of the positive electrode electrolyte and the negative electrode electrolyte. In the cell 100 shown in FIG. 1, the solid line arrow indicates a charging reaction, and the dashed line arrow indicates a discharging reaction. The RF battery 1 is connected, through an alternating current/direct current converter C, to a power system L, and for example, is used for load leveling, for voltage sag compensation and emergency power sources, and for smoothing the output of natural energy, such as solar power generation or wind power generation that is being introduced on a massive scale.

<<Cell>>

The RF battery 1 includes a cell 100 which includes a positive electrode 104, a negative electrode 105, and a membrane 101 interposed between the positive electrode 104 and the negative electrode 105 (refer to FIG. 1). In this example, the cell 100 is separated into a positive electrode cell 102 and a negative electrode cell 103 by a membrane 101 that allows hydrogen ions to permeate therethrough, and the positive electrode cell 102 and the negative electrode cell 103 contain the positive electrode 104 and the negative electrode 105, respectively. The positive electrode cell 102 is connected via ducts 108 and 110 to a positive electrode electrolyte tank 106 that stores a positive electrode electrolyte. The duct 108 is provided with a pump 112 for circulating the positive electrode electrolyte from the positive electrode electrolyte tank 106 to the positive electrode cell 102, and the members 106, 108, 110, and 112 constitute a positive electrolyte circulation mechanism 100P for circulating the positive electrode electrolyte. Similarly, the negative electrode cell 103 is connected via ducts 109 and 111 to a negative electrode electrolyte tank 107 that stores a negative electrode electrolyte. The duct 109 is provided with a pump 113 for circulating the negative electrode electrolyte from the negative electrode electrolyte tank 107 to the negative electrode cell 103, and the members 107, 109, 111, and 113 constitute a negative electrolyte circulation mechanism 100N for circulating the negative electrode electrolyte. During operation in which charging and discharging are performed, the pumps 112 and 113 are driven so that the positive and negative electrolytes are circulated within the cell 100 (positive electrode cell 102 and negative electrode cell 103). During a standby period in which charging and discharging are not performed, the pumps 112 and 113 are stopped so that circulation of the electrolytes is stopped. In this example, during usual operation, the pumps 112 and 113 are driven by supplying power to the pumps 112 and 113 from the power system L.

<<Cell Stack>>

Figure 2:
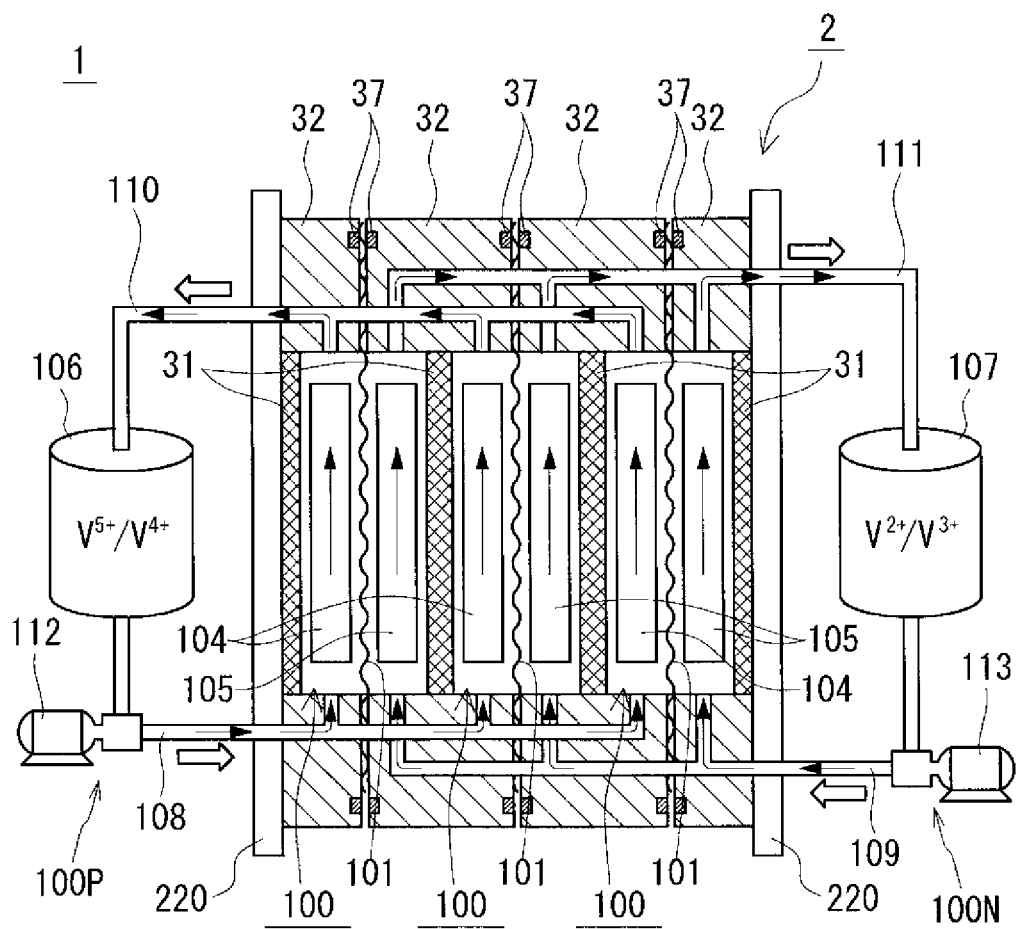
FIG. 2 is a schematic diagram of a redox flow battery according to an embodiment.
Figure 3:
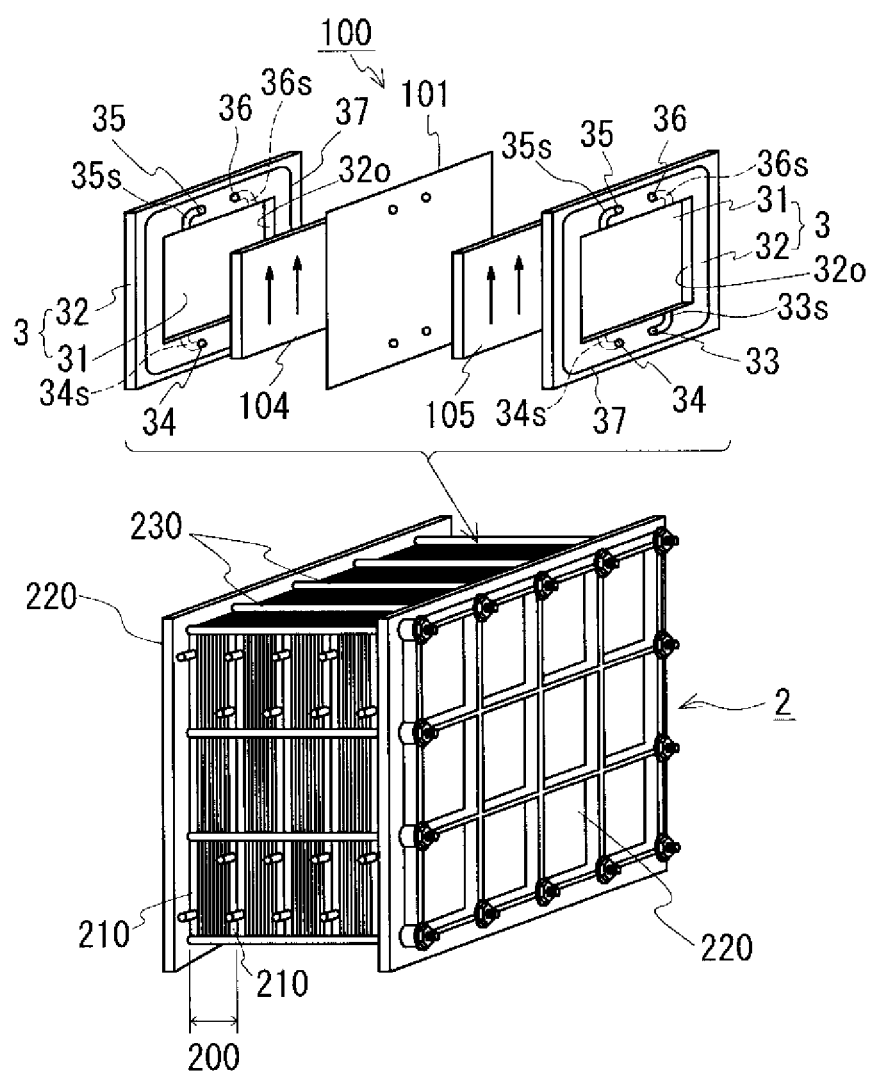
FIG. 3 is a schematic diagram of a cell stack according to an embodiment.

In this example, as shown in FIGS. 2 and 3, the RF battery 1 includes a cell stack 2 in which cells 100 are repeatedly stacked. The cell stack 2 is configured such that a layered body referred to as a sub-stack 200 (refer to FIG. 3) is sandwiched between two end plates 220 and the end plates 220 on both sides are fastened with a fastening mechanism 230 (in the configuration illustrated in FIG. 3, a plurality of sub-stacks 200 are included). The sub-stack 200 has a configuration in which cell fames 3, positive electrodes 104, membranes 101, and negative electrodes 105 are repeatedly stacked, and supply/drainage plates 210 (refer to the view shown in the lower part of FIG. 3; omitted in FIG. 2) are disposed on both ends of the layered body. In the cell stack 2, the number of cells 100 stacked is, for example, 5 or more, 50 or more, or 100 or more. The upper limit of the number of cells 100 stacked is not particularly limited, but is, for example, 200 or less.

<<Cell Frame>>

As shown in FIGS. 2 and 3, a cell frame 3 includes a bipolar plate 31 which is disposed between a positive electrode 104 and a negative electrode 105, and a frame body 32 which is provided around the bipolar plate 31. The positive electrode 104 is disposed so as to be in contact with the one surface side of the bipolar plate 31, and the negative electrode 105 is disposed so as to be in contact with the other surface side of the bipolar plate 31. The bipolar plate 31 is provided inside the frame body 32, and a recess 32o is formed by the bipolar plate 31 and the frame body 32 (also refer to FIG. 4). Recesses 32o are formed on both sides of the bipolar plate 31 (in FIG. 4, on the front side and the back side of the sheet), and a positive electrode 104 and a negative electrode 105 are placed in their respective recesses 32o with the bipolar plate 31 therebetween. In the sub-stack 200 (cell stack 2), the one surface side of the frame body 32 of one of two adjacent cell frames 3 faces the other surface side of the frame body 32 of the other cell frame 3, and a cell 100 is formed between bipolar plates 31 of two adjacent cell frames 3.

The bipolar plate 31 is, for example, made of carbon plastic or the like, and the frame body 32 is, for example, made of a plastic, such as a vinyl chloride resin (PVC), polypropylene, polyethylene, a fluorine resin, or an epoxy resin. The bipolar plate 31 is formed by a known method, such as injection molding, press molding, or vacuum forming. In the cell frame 3 shown in this example, the frame body 32 is integrated around the bipolar plate 31 by injection molding or the like. In this example, the planar shape (shape viewed in plan) of the bipolar plate 31 is rectangular, and the frame body 32 is rectangular frame-shaped.

Figure 4:
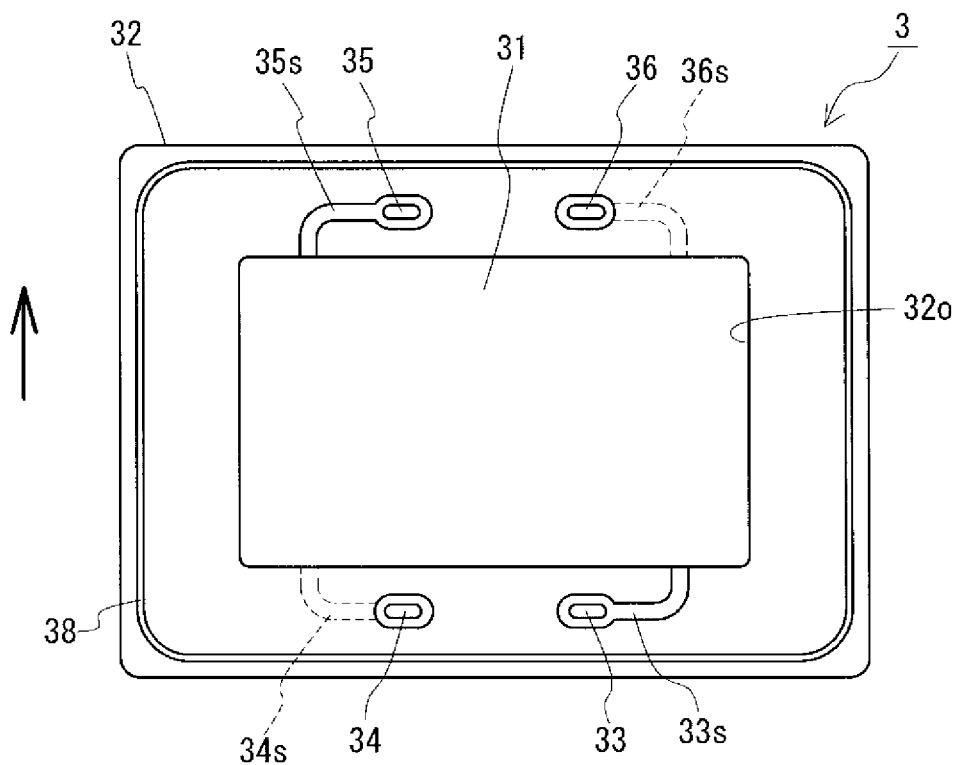
FIG. 4 is a schematic plan view of a cell frame in a cell stack according to an embodiment, viewed from the one surface side thereof

Circulation of electrolytes to the cell 100 is performed, through supply/drainage plates 210 (refer to the lower part of FIG. 3), by liquid supply manifolds 33 and 34 and liquid discharge manifolds 35 and 36 which are provided so as to pass through the frame body 32 of the cell frame 3 shown in FIG. 3 and liquid supply slits 33s and 34s and liquid discharge slits 35s and 36s formed on the frame body 32 (also refer to FIG. 4). In the case of the cell frame 3 (frame body 32) in this example, the positive electrode electrolyte is supplied from the liquid supply manifold 33 provided on the lower part of the frame body 32 through the liquid supply slit 33s formed on the one surface side (on the front side of the sheet in FIG. 4) of the frame body 32 to the positive electrode 104, and is discharged through the liquid discharge slit 35s formed on the upper part of the frame body 32 to the liquid discharge manifold 35. Similarly, the negative electrode electrolyte is supplied from the liquid supply manifold 34 provided on the lower part of the frame body 32 through the liquid supply slit 34s formed on the other surface side (on the back side of the sheet in FIG. 4) of the frame body 32 to the negative electrode 105, and is discharged through the liquid discharge slit 36s formed on the upper part of the frame body 32 to the liquid discharge manifold 36. Rectifying portions (not shown) may be formed along an inner lower edge and an inner upper edge of the frame body 32 on which the bipolar plate 31 is provided. The rectifying portions function to diffuse the electrolytes supplied from the liquid supply slits 33s and 34s along the lower edges of the electrodes 104 and 105, and to collect the electrolytes discharged from the upper edges of the electrodes 104 and 105 to the liquid discharge slits 35s and 36s.

In the cell 100 in this example, the electrolytes are supplied from the lower side of the positive electrode 104 and the negative electrode 105, and the electrolytes are discharged from the upper side of the electrodes 104 and 105. In each of the electrodes 104 and 105, the electrolyte flows from the lower edge toward the upper edge (in FIG. 4, the thick line arrow on the left side of the sheet indicates the overall direction in which the electrolytes flow). A plurality of groove portions (not shown) may be formed on the surfaces of the bipolar plate 31 in contact with the electrodes 104 and 105 so as to extend in the direction in which the electrolytes flow. Thereby, the electrolyte flow resistance can be decreased, and the electrolyte pressure loss can be reduced. The cross-sectional shape (the shape of a cross section orthogonal to the electrolyte flowing direction) of the groove portion is not particularly limited, and may be, for example, rectangular, triangular (V-shaped), trapezoidal, semicircular, or semi-elliptic.

In addition, ring-shaped sealing members 37, such as O-rings and flat packings, (refer to FIGS. 2 and 3) are disposed between the frame bodies 32 of the cell frames 3 so that leakage of the electrolytes can be suppressed. The frame body 32 is provided with sealing grooves 38 (refer to FIG. 4) for disposing the sealing members 37.

Figure 5:
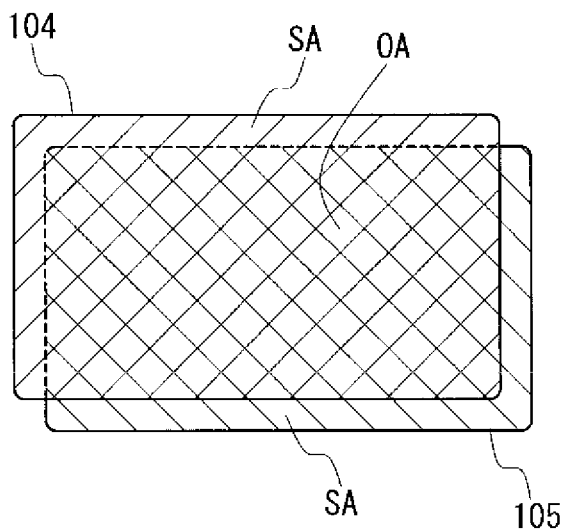
FIG. 5 is a schematic plan view perspectively showing an example of the arrangement of a positive electrode and a negative electrode in a cell according to an embodiment.

One of the characteristics of the cell 100 according to the embodiment is the arrangement of the positive electrode 104 and the negative electrode 105 which are arranged so as to face each other with the membrane 101 therebetween. Specifically, the positive electrode 104 and the negative electrode 105 have an overlapping region OA in which the positive electrode 104 and the negative electrode 105 overlap each other with the membrane 101 therebetween, and at least one of the positive electrode 104 and the negative electrode 105 has a non-overlapping region SA in which the positive electrode 104 and the negative electrode 105 do not overlap each other with the membrane 101 therebetween (refer to FIG. 5). The arrangement of the positive electrode 104 and the negative electrode 105 in the cell 100 will be described below with reference to mainly FIG. 5. In FIG. 5, the membrane is omitted.

<<Positive Electrode and Negative Electrode>>

Each of the positive electrode 104 and the negative electrode 105 is a reaction site where the active material (ions) contained in the electrolyte causes a battery reaction. The electrodes 104 and 105 each can be made of a known material, and for example, are made of a nonwoven fabric (carbon felt) or woven fabric (carbon cloth) composed of carbon fibers, paper (carbon paper), or the like. In this example, the planar shape of each of the electrodes 104 and 105 is rectangular.

The thickness of each of the electrodes 104 and 105 is not particularly limited, but is, for example, 0.05 mm or more, or 0.2 mm or more. When the thickness of each of the electrodes 104 and 105 is 0.05 mm or more, by securing the amount of electrolyte flowing in each of the electrodes 104 and 105, output during charging and discharging is easily secured. Here, the thickness of each of the electrodes 104 and 105 is the thickness of the electrode in the state in which the cell 100 (refer to FIG. 3) is assembled. In the case where each of the electrodes 104 and 105 is held in a compressed state in the thickness direction in the cell 100 (the recess 32o of the cell frame 3), the thickness refers to the thickness of the electrode in the compressed state. In this case, the depth of the recess 32o corresponds to the thickness of each of the electrodes 104 and 105. The upper limit of the thickness of each of the electrodes 104 and 105 is, for example, 3.0 mm or less.

The area of each of the electrodes 104 and 105 is not particularly limited, but is, for example, 250 $cm^2$ or more, or 500 $cm^2$ or more. When the area of each of the electrodes 104 and 105 is 250 $cm^2$ or more, by securing the amount of electrolyte flowing in each of the electrodes 104 and 105, output during charging and discharging is easily secured. Here, the area of the electrode 104 and the area of the electrode 105 refer to the planar areas of the planes of the electrodes that face each other. The electrodes 104 and 105 may have the same area or different areas. In this example, the area of the electrode 104 is equivalent to the area of the electrode 105. The upper limit of the area of each of the electrodes 104 and 105 is, for example, about 8,000 $cm^2$.

<Arrangement of Electrodes>

In this embodiment, as shown in FIG. 5, the positive electrode 104 and the negative electrode 105 are arranged such that the electrodes 104 and 105 have an overlapping region OA and each of the electrodes 104 and 105 has a non-overlapping region SA when viewed in plan. FIG. 5 shows an arrangement state of the positive electrode 104 and the negative electrode 105 in the cell 100 when perspectively viewed from the positive electrode 104 side. In the example of the arrangement of electrodes shown in FIG. 5, the positive electrode 104 and the negative electrode 105 are arranged so as to be shifted obliquely. Specifically, the positive electrode 104 is moved obliquely toward the upper left and the negative electrode 105 is moved obliquely toward the lower right from the state in which the positive electrode 104 and the negative electrode 105 overlap each other with their centers coinciding with each other. In this example, the area of the positive electrode 104 is equivalent to the area of the negative electrode 105, and each of the positive electrode 104 and the negative electrode 105 has a non-overlapping region SA. Furthermore, the non-overlapping region SA of the positive electrode 104 and the non-overlapping region SA of the negative electrode 105 have the same area. In FIG. 5, in order to facilitate understanding, the overlapping region OA of the positive electrode 104 and the negative electrode 105 is indicated by double hatching, the non-overlapping region SA of the positive electrode 104 is indicated by the hatching that slants to the upper right, and the non-overlapping region SA of the negative electrode 105 is indicated by the hatching that slants to the lower right.

FIG. 5 shows an example in which the positive electrode 104 and the negative electrode 105 are arranged so as to be shifted obliquely. However, the positive electrode 104 and the negative electrode 105 may be arranged so as to be shifted in the upward-downward direction (in the longitudinal direction) or may be arranged so as to be shifted in the leftward-rightward direction (in the horizontal direction).

Furthermore, the positive electrode 104 and the negative electrode 105 may have different areas, and one electrode having a small area may be arranged so as to entirely overlap the other electrode having a large area. In this case, only one of the positive electrode 104 and the negative electrode 105 having a large area has a non-overlapping region SA, and the other electrode having a small area has only an overlapping region OA. In addition, in the case where the positive electrode 104 and the negative electrode 105 have different areas, one electrode having a small area can be arranged so as to partially protrude from the other electrode having a large area. In this case, the electrode having a small area can also have a non-overlapping region SA.

In the case where the electrode size is small relative to recesses 32o (refer to FIG. 3) of the cell frame 3 in which the electrodes 104 and 105 are placed, in order to position the electrodes, protruding portions (not shown) which protrude toward the electrode side may be formed on the inner peripheral surface of the frame body 32, or protruding portions which protrude toward the frame body 32 may be formed on the outer peripheral surfaces of the electrodes. The size of the protruding portions may be set such that the electrodes can be supported. In the case where protruding portions are formed on the outer peripheral surfaces of the electrodes, the size of the protruding portions may be set as small as possible in order to avoid an excessive increase in the overlapping region. Alternatively, the electrodes can be positioned by inserting separate positioning pieces (not shown) between the inner peripheral surface of the frame body 32 and the outer peripheral surface of each of the electrodes 104 and 105. The positioning pieces may be formed of a material having moderate flexibility and resistance to electrolyte (electrolyte resistance), such as rubber, sponge rubber, or a resin. Examples of the resin constituting the positioning pieces include polyethylene foam, urethane foam, and polystyrene foam.

As shown in FIG. 5, in the case where at least one of the positive electrode 104 and the negative electrode 105 (each in this example) has a non-overlapping region SA, the unreacted electrolyte that has not participated in the battery reaction is present in the non-overlapping region SA. The reason for this is that, since the non-overlapping region SA is a portion that does not contribute to the battery reaction between the electrodes 104 and 105, the electrolyte flows in an unreacted state in the non-overlapping region SA. That is, in the case where pumps 112 and 113 stop during power failure in the power system L and electrolyte flow stops (refer to FIGS. 1 and 2), the unreacted electrolyte remains partially in the cell 100. The unreacted electrolyte present in the non-overlapping region SA diffuses into the overlapping region OA to cause a battery reaction between the electrodes 104 and 105, and thereby, the necessary power to start the pumps 112 and 113 can be supplied from the cell 100 (cell stack 2) during power failure. In this example, since each of the positive electrode 104 and the negative electrode 105 has the non-overlapping region SA, the unreacted electrolyte is present in each of the non-overlapping regions SA. Therefore, it is possible to reliably cause a battery reaction between the electrodes 104 and 105. Furthermore, the non-overlapping region SA in the positive electrode 104 and the non-overlapping region SA in the negative electrode 105 have the same area, and the same amount of electrode flows in the non-overlapping region SA in each electrode. Therefore, it is possible to sufficiently cause a battery reaction between the electrodes 104 and 105.

<Area Ratio Between Overlapping Region and Non-Overlapping Region>

In this embodiment, the total area of the non-overlapping region in the positive electrode 104 and the negative electrode 105 is 0.1% to 20% of the area of the overlapping region OA. Since the total area of the non-overlapping region SA is 0.1% or more of the area of the overlapping region OA, by securing the amount of electrolyte flowing in the non-overlapping region SA, the necessary power to start the pumps 112 and 113 during power failure is easily secured. On the other hand, as the area ratio of the non-overlapping region SA (total area of non-overlapping region SA/area of overlapping region OA) increases, the proportion of the electrolyte that flows in the non-overlapping region increases, and the amount of electrolyte that flows in the overlapping region OA decreases. Since the total area of the non-overlapping region SA is 20% or less of the area of the overlapping region OA, by securing the overlapping region OA that contributes to the battery reaction, a decrease in output during charging and discharging can be suppressed. Preferably, the total area of the non-overlapping region SA is, for example, 0.2% to 15% of the area of the overlapping region OA.

Advantageous Effects of Embodiments

The cell 100, the cell stack 2, and the RF battery 1 according to the embodiments have the following operational advantages.

<<Cell>>

In the cell 100 according to the embodiment, at least one of the positive electrode 104 and the negative electrode 105 has a non-overlapping region SA. Thus, in the case where the pumps 112 and 113 stop during power failure in the power system L, the unreacted electrolyte that is present in the non-overlapping region SA diffuses into the overlapping region OA, and accordingly, because of discharging between the electrodes 104 and 105, the necessary power to start the pumps 112 and 113 can be discharged. Therefore, in the cell 100 according to the embodiment, the power for starting the pumps 112 and 113 can be supplied during power failure in the power system L.

In the RF battery 1 including the cell 100, even under the condition where power is not supplied from the outside to the pumps 112 and 113, by supplying power from the cell 100 to the pumps 112 and 113, the pumps can be started. For example, even when power failure occurs in the power system L during discharging of the RF battery 1 and the pumps 112 and 113 stop, the necessary power to start the pumps 112 and 113 can be secured by the electrolyte that has not participated in the battery reaction and is present in the non-overlapping region SA in the cell 100. Furthermore, even if self-discharge of the electrolyte proceeds in the overlapping region OA between the electrodes 104 and 105 during the downtime of the pumps 112 and 113, since the unreacted electrolyte that is present in the non-overlapping region SA diffuses into the overlapping region OA, the power stored in the unreacted electrolyte can be discharged over a long period of time. Accordingly, it is possible to ease the time constraint on the period from the stop of the pumps 112 and 113 due to power failure until the start of the pumps 112 and 113.

When the total area of the non-overlapping region SA is 0.1% to 20% of the area of the overlapping region OA, the amount of electrolyte flowing in each of the non-overlapping region SA and the overlapping region OA is moderately easily secured, the necessary power to start the pumps 112 and 113 during power failure is secured, and output during charging and discharging is easily secured in the normal operation.

As in the cell 100 according to the embodiment, in the case where each of the positive electrode 104 and the negative electrode 105 has the non-overlapping region SA, the unreacted electrolyte is present in the non-overlapping region SA of each of the electrodes 104 and 105. Therefore, it is possible to reliably cause discharging of the electrolyte between the electrodes 104 and 105, and by supplying the necessary power to start the pumps 112 and 113 during power failure, the pumps 112 and 113 can be reliably started. Furthermore, in the case where the area of the positive electrode 104 is equivalent to the area of the negative electrode 105, non-overlapping regions SA having the same area are formed in the positive electrode 104 and the negative electrode 105. Therefore, it is possible to sufficiently cause discharging of the electrolyte between the electrodes 104 and 105, and the necessary power to start the pumps 112 and 113 during power failure can be sufficiently supplied.

Furthermore, when the positive electrode 104 and the negative electrode 105 each have a thickness of 0.05 mm or more, the amount of electrolyte flowing in the non-overlapping region SA is sufficiently easily secured. Accordingly, the necessary power to start the pumps 112 and 113 during power failure is sufficiently easily secured. When the positive electrode 104 and the negative electrode 105 each have an area of 250 cm$^2$ or more, the area of each of the overlapping region OA and the non-overlapping region SA is sufficiently easily secured, and the amount of electrolyte flowing in each region is sufficiently easily secured. Accordingly, output during charging and discharging can be secured, and the necessary power to start the pumps 112 and 113 during power failure is sufficiently easily secured.

<<Cell Stack>>

Since the cell stack 2 according to the embodiment includes the cell 100 according to the embodiment, it is possible to supply the power for starting the pumps 112 and 113 during power failure in the power system L. The cell stack 2 includes a plurality of cells 100, and it is easy to secure the necessary power to start the pumps 112 and 113 by using the unreacted electrolyte present in the non-overlapping region SA in each cell 100. Accordingly, the necessary power to start the pumps 112 and 113 can be sufficiently supplied from the cell stack 2.

<<RF Battery>>

Since the RF battery 1 according to the embodiment includes the cell 100 or cell stack 2 according to the embodiment, the necessary power to start the pumps 112 and 113 during power failure in the power system L can be supplied from the cell 100 or cell stack 2, and the pumps 112 and 113 can be started. Accordingly, the RF battery 1 according to the embodiment can restart operation on its own during power failure in the power system L.

TEST EXAMPLE 1

RF batteries (specimens A to D) with different arrangements of a positive electrode and a negative electrode in a cell were assembled, and by using the RF batteries, a pump start-up test was conducted.

Multilayered bodies were formed by successively repeatedly stacking cell frames, positive electrodes, membranes, and negative electrodes, and cell stacks were fabricated. Electrodes made of carbon felt with the same shape and size were used as the positive electrodes and the negative electrodes. The positive electrodes and negative electrodes used had a rectangular planar shape, the same area, and the same thickness. The area was 250 cm$^2$ and the thickness was 0.3 mm. In each of the cell stacks, the number of cells stacked was 5.

In this test, four types of cell stack were fabricated, in which electrodes were arranged such that the total area of the non-overlapping region was 0.1%, 20%, 0.05%, or 0% of the area of the overlapping region in the positive electrode and the negative electrode in each cell constituting the cell stacks. Circulation mechanisms for circulating electrolytes were installed on each of the cell stacks, and thus, RF battery specimens A to D were assembled. Here, the expression "the total area of the non-overlapping region is 0% of the area of the overlapping region" means that the entire surfaces of the two electrodes overlap each other.

In the test method, after each RF battery specimen was charged, discharging was performed, pumps were stopped during discharging, and by supplying power from the cell stack to the pumps during the downtime of the pumps, it was checked whether or not the pumps were started. Table 1 shows whether the pumps could be started or not. The necessary power to start the pumps used is 5 W. In Table 1, "A" represents the case where the pumps could be started, and "B" represents the case where the pumps could not be started.

TABLE 1

| Specimen | Total area of non-overlapping region/area of overlapping region | Started or not started |
|---|---|---|
| A | 0.1% | A |
| B | 20% | A |
| C | 0.05% | B |
| D | 0% | B |

It has been confirmed from the results shown in Table 1 that when the total area of the non-overlapping region is 0.1% or more of the area of the overlapping region, the power to start the pumps can be supplied.

APPLICATION OF EMBODIMENTS

The redox flow battery cells and redox flow battery cell stacks according to the embodiments can be suitably used for redox flow batteries.

The invention claimed is:

1. A redox flow battery cell comprising a positive electrode, a negative electrode, and a membrane interposed between the positive electrode and the negative electrode,
wherein the positive electrode and the negative electrode have an overlapping region where the positive electrode and the negative electrode overlap each other with the membrane therebetween, and each of the positive electrode and the negative electrode has a non-overlapping region where the positive electrode and the negative electrode do not overlap each other with the membrane therebetween,
wherein the total area of the non-overlapping region is 0.1% to 20% of the area of the overlapping region, and
wherein each of the positive electrode and the negative electrode has the non-overlapping region within planes of the positive electrode and negative electrode that face each other.

2. The redox flow battery cell according to claim 1, wherein the positive electrode has an area equivalent to that of the negative electrode.

3. The redox flow battery cell according to claim 1, wherein the positive electrode and the negative electrode each have a thickness of 0.05 mm or more.

4. The redox flow battery cell according to claim 1, wherein the positive electrode and the negative electrode each have an area of 250 $cm^2$ or more.

5. A redox flow battery cell stack comprising the redox flow battery cells according to claim 1, the redox flow battery cells being repeatedly stacked.

6. A redox flow battery comprising the redox flow battery cell according to claim 1.

7. A redox flow battery comprising the redox flow battery cell stack according to claim 5.

8. The redox flow battery cell according to claim 1, wherein a total planar area of a plane of the positive electrode facing the negative electrode is equivalent to a total planar area of a plane of the negative electrode facing the positive electrode.

* * * * *